US012742739B2

(12) United States Patent
Zhang et al.

(10) Patent No.: US 12,742,739 B2
(45) Date of Patent: Sep. 22, 2026

(54) RAY SCANNING APPARATUS AND RAY SCANNING SYSTEM

(71) Applicants: Nuctech Company Limited, Beijing (CN); Tsinghua University, Beijing (CN)

(72) Inventors: Li Zhang, Beijing (CN); Zhiqiang Chen, Beijing (CN); Qingping Huang, Beijing (CN); Xin Jin, Beijing (CN); Hui Ding, Beijing (CN); Yong Zhou, Beijing (CN); Bintao Wei, Beijing (CN); Zhenhua Zhao, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 160 days.

(21) Appl. No.: 18/575,224

(22) PCT Filed: Jul. 7, 2022

(86) PCT No.: PCT/CN2022/104297
§ 371 (c)(1),
(2) Date: Dec. 28, 2023

(87) PCT Pub. No.: WO2023/280256
PCT Pub. Date: Jan. 12, 2023

(65) Prior Publication Data

US 2024/0288385 A1 Aug. 29, 2024

(30) Foreign Application Priority Data

Jul. 7, 2021 (CN) ........................ 202110769688.X

(51) Int. Cl.
*G01N 23/04* (2018.01)

(52) U.S. Cl.
CPC ......... *G01N 23/04* (2013.01); *G01N 2223/20* (2013.01); *G01N 2223/308* (2013.01); *G01N 2223/321* (2013.01)

(58) Field of Classification Search
CPC ............... G01N 23/04; G01N 2223/20; G01N 2223/308; G01N 2223/321; G01N 23/046; G01V 5/22; G01V 5/226
See application file for complete search history.

(56) References Cited

U.S. PATENT DOCUMENTS 6,088,423 A * 7/2000 Krug ...................... G01V 5/224 378/57
6,125,167 A * 9/2000 Morgan .................. H01J 35/10 378/124

(Continued)

FOREIGN PATENT DOCUMENTS

CN 203084216 U 7/2013
CN 103901488 A 7/2014

(Continued)

OTHER PUBLICATIONS

"European Application No. 22837001.1, Supplementary European Search Report dated Apr. 25, 2025", (Apr. 25, 2025).

(Continued)

*Primary Examiner* — Courtney D Thomas
(74) *Attorney, Agent, or Firm* — Schwegman Lundberg & Woessner, P.A.

(57) ABSTRACT

A ray scanning apparatus for a luggage conveying system. The apparatus includes: a conveying device for conveying an object under inspection to pass through a scanning area of the ray scanning apparatus; and a plurality of scanning beam planes disposed on a plurality of scanning planes arranging in a conveying direction of the object under inspection, each scanning beam plane includes a ray source module and a detector assembly which are arranged opposite (Continued)

to each other, and the ray source module includes a plurality of ray source points for emitting ray beams, wherein the ray source modules of the plurality of scanning beam planes are arranged on lower, left, and right sides of the scanning area respectively.

16 Claims, 11 Drawing Sheets

(56) References Cited

U.S. PATENT DOCUMENTS

| | | | | |
|---|---|---|---|---|
| 7,233,644 | B1 | 6/2007 | Bendahan et al. | |
| 7,831,012 | B2 * | 11/2010 | Foland | G01N 23/04 378/57 |
| 2011/0142201 | A1 | 6/2011 | Eberhard et al. | |
| 2014/0185743 | A1 | 7/2014 | Zhang et al. | |
| 2014/0294147 | A1 * | 10/2014 | Chen | G01V 5/232 378/57 |

FOREIGN PATENT DOCUMENTS

| | | | |
|---|---|---|---|
| CN | 103901493 | A | 7/2014 |
| CN | 103993491 | A | 8/2014 |
| CN | 203995135 | U | 12/2014 |
| CN | 104483711 | A | 4/2015 |
| CN | 104749197 | A | 7/2015 |
| CN | 105603788 | A | 5/2016 |
| CN | 105784733 | A | 7/2016 |
| CN | 106185226 | A | 12/2016 |
| CN | 107284029 | A | 10/2017 |
| CN | 207457102 | U | 6/2018 |
| CN | 108267465 | A | 7/2018 |
| CN | 109572238 | A | 4/2019 |
| CN | 210323411 | U | 4/2020 |
| CN | 111856604 | A | 10/2020 |
| CN | 215640962 | U | 1/2022 |
| CN | 114047209 | A | 2/2022 |
| CN | 216610584 | U | 5/2022 |
| CN | 115096922 | A | 9/2022 |
| EP | 1994400 | B1 | 4/2021 |
| JP | S6367552 | A | 3/1988 |
| JP | 2014130142 | A | 7/2014 |
| JP | 2017501414 | A | 1/2017 |
| JP | 2018197673 | A | 12/2018 |
| JP | 2019191083 | A | 10/2019 |
| WO | WO-2020134127 | A1 | 7/2020 |
| WO | WO-2021073216 | A1 | 4/2021 |
| WO | WO-2021114791 | A1 | 6/2021 |
| WO | WO-2023280256 | A1 | 1/2023 |

OTHER PUBLICATIONS

"Chinese Application No. 202110769688, First Office Action dated Sep. 20, 2024", (Sep. 20, 2024), 15 pgs.

"Chinese Application No. 202311065760.6, Chinese Search Report dated Oct. 8, 2023", (Oct. 8, 2023), 2 pgs.

"Chinese Application No. 202311065760.6, First Office Action dated Oct. 8, 2023", (Oct. 8, 2023), 7 pgs.

"Chinese Application No. 202311065760.6, Notification to Grant Patent Right for Invention dated Oct. 19, 2023", (Oct. 19, 2023), 2 pgs.

Jin, Xin, et al., "A Dual-energy Stationary CT System Based on Dual-plane Scanning Mode", CT Theory and Applications, vol. 29, No. 1, doi: 10.15953/j.1004-4140.2020.29.01.04, (Feb. 2020), 31-37.

"International Application No. PCT/CN2022/104297, Search Report dated Sep. 23, 2022", (Sep. 23, 2022), 11 pgs.

"International Application No. PCT/CN2022/104297, Written Opinion mailed Sep. 23, 2022", (Sep. 23, 2022), 6 pgs.

"Japanese Application No. 2023-579426, Notice of Reasons for Refusal dated Dec. 19, 2024", (Dec. 19, 2024), 8 pgs.

"Korean Application No. 10-2023-7044625, Office Action dated Sep. 12, 2025", with English translation, Sep. 12, 2025, 18 pages.

Gonzales, Brian, "Rectangular computed tomography using a stationary array of CNT emitters initial experimental results", Medical Imaging 2013 Physics of Medical Imaging. vol. 8668, Dec. 31, 2013, 9 pgs.

* cited by examiner

RAY SCANNING APPARATUS AND RAY SCANNING SYSTEM

CROSS-REFERENCE TO RELATED APPLICATIONS

The present application is a U.S. national stage filing under 35 U.S.C. § 371 from International Application No. PCT/CN2022/104297, filed on Jul. 7, 2022, and published as WO2023/280256 on Jan. 12, 2023, which claims the benefit of and priority to Chinese patent application No. 202110769688. X, entitled "RAY SCANNING APPARATUS AND RAY SCANNING SYSTEM" filed on Jul. 7, 2021, which is incorporated by reference in its entirety.

TECHNICAL FIELD

The present application relates to the field of radiation imaging, and specifically to a ray scanning apparatus for a luggage conveying system and a ray scanning system for luggage inspection.

BACKGROUND

Ray scanning technologies, which can eliminate influences of overlapping of objects, play an important role in security inspection. A conventional ray scanning apparatus uses a slip ring device to obtain projection data from different angles through rotation of an X-ray machine and a detecting device, and obtains tomographic images through a reconstruction method, so as to obtain internal information of inspected luggage. By cooperating with a dual- or multi-energy imaging technology, the current luggage inspection apparatus can reconstruct the atomic number and electron density of inspected substance, thereby recognizing categories of objects and achieving a good effect in the inspection of explosives, dangerous goods, etc.

SUMMARY

Existing security ray scanning apparatus still face some shortcomings. For example, a current airport luggage conveying system usually has a high luggage conveying speed to satisfy timeliness, which requires a security inspection device to have a corresponding high inspection speed. The increase in the inspection speed may increase radiation, costs, etc.

In response to the above problems, the present application provides a ray scanning apparatus for a luggage conveying system, including a conveying device for conveying an object under inspection to pass through a scanning area of the ray scanning apparatus; and a plurality of scanning beam planes disposed on a plurality of scanning planes arranging in a conveying direction of the object under inspection, each scanning beam plane including a ray source module and a detector assembly which are arranged opposite each other, and the ray source module including a plurality of ray source points for emitting ray beams, where the ray source modules of the plurality of scanning beam planes are arranged on a lower side, a left side, and a right side of the scanning area respectively.

Embodiments of the present application further provide a ray scanning system for luggage inspection, including the ray scanning apparatus according to the embodiments of the present application and a luggage conveying system, the luggage conveying system including a conveying belt for conveying luggage, where the conveying device of the ray scanning apparatus matches the conveying belt in height and speed.

The embodiments of the present application provide a mounting-positioning structure for a ray source module of a ray scanning apparatus, where the ray scanning apparatus includes the ray source module and a stationary support frame, the mounting-positioning structure includes a main body, and the main body can be fixedly connected to the ray source module and the support frame, so that the ray source module can be fixedly mounted to the support frame through the main body; the mounting-positioning structure further includes: a moving device, where the ray source module can be moved to a predetermined mounting position on a first plane through the moving device; a first positioning device for positioning the ray source module on the first plane; a lifting device for adjusting a position of the ray source module in a first direction, where the first direction is perpendicular to the first plane; and a second positioning device for fixing the position of the ray source module in the first direction.

By using the mounting-positioning structure according to the foregoing embodiments, the respective ray source modules of the ray scanning apparatus can be mounted and detached independently from each other, and beam output angles of the ray source modules can also be adjusted.

The embodiments of the present application further provide a mounting-fixing structure for a detector assembly of a ray scanning apparatus, where the ray scanning apparatus includes the detector assembly and a stationary support frame, the detector assembly includes one or more detector sets, each detector set is fixedly mounted to the support frame or detached from the support frame via the mounting-fixing structure, and the mounting-fixing structure includes: a first mounting portion fixedly disposed on the detector set; a second mounting portion fixedly disposed on the support frame and capable of being in linear moving fit with the first mounting portion, where the detector set can be moved along the second mounting portion to a predetermined mounting position when the first mounting portion and the second mounting portion engage with each other; and a fixing device disposed on a side of the detector set in a width direction to fix the detector set relative to a mounting reference plane on the support frame.

By using the mounting-fixing structure according to the foregoing embodiments, the respective detector sets of the detector assembly can be mounted and detached independently from each other, and can be configured as required to be mounted, detached and maintained along the conveying direction of the object under inspection or a direction perpendicular to the conveying direction, thereby improving the convenience of mounting, detaching and maintenance of the detector sets.

Other features and technical advantages of the present application will be clearer in the following detailed descriptions with reference to the accompanying drawings and other embodiments.

DETAILED DESCRIPTION

Figure 1A:
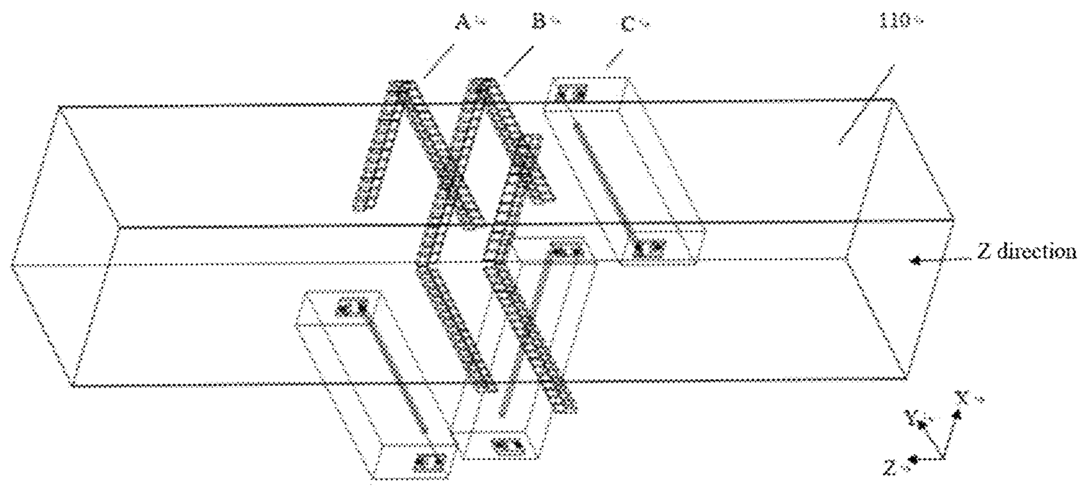
FIG. 1A illustrates a schematic diagram of an overall structure of a ray scanning apparatus according to an embodiment of the present application.

In order to clearly describe the technical problems to be solved, technical solutions, and beneficial effects of the present application, the present application will be further described in detail below with reference to the accompanying drawings and embodiments. It should be understood that the specific embodiments described here are merely used for explaining the present application, but not for limiting the scope of the present application.

In response to the technical problems in existing technologies, the embodiments of the present application provide a ray scanning apparatus for a luggage conveying system. The ray scanning apparatus includes a conveying device for conveying an object under inspection to pass through a scanning area of the ray scanning apparatus, and a plurality of scanning beam planes disposed on a plurality of scanning planes arranging in a conveying direction of the object under inspection, where each scanning beam plane includes a corresponding ray source module and a detector assembly. When the object under inspection is carried by the conveying device to pass through the scanning area, the plurality of scanning beam planes scan the object under inspection and generate corresponding digital signals. The ray scanning apparatus can further include a control device, and the control device can perform image reconstruction based on the digital signals generated by the scanning beam planes, so as to obtain internal information of the object under inspection. Herein, the object under inspection is an item that requires security inspection, such as a luggage and a package, and the scanning area is defined by the ray source modules and detector assemblies of the respective scanning beam planes.

Specifically, each scanning beam plane includes a ray source module and a detector assembly disposed opposite each other; here, each ray source module of each scanning beam plane includes a plurality of ray source points for emitting ray beams. The plurality of ray source modules of the plurality of scanning beam planes are arranged on a lower side, a left side, and a right side of the scanning area respectively, and optionally, when observed in the conveying direction of the object under inspection, the plurality of ray source modules of the plurality of scanning beam planes form a semi-enclosed structure surrounding the scanning area and opening on an upper side. Since at least one scanning beam plane in which the ray source module is arranged on the lower side of the scanning area, is provided, the conveying device of the ray scanning apparatus in the present application may have a relative high height relative to a surface (such as the ground) where the ray scanning apparatus is placed, so as to match a conveying line of the object under inspection (such as the luggage conveying system) which is arranged at upstream or downstream of the ray scanning apparatus and has a relatively high height (for example, have the same height as a conveying belt of the luggage conveying system). Herein, the upper side, lower side, left side, and right side of the scanning area refer to the upper side, lower side, left side, and right side of the scanning area when observed in the conveying direction of the object under inspection.

Moreover, the detector assembly of each scanning beam plane are arranged opposite to the ray source module and capable of receiving almost all rays penetrating through the object under inspection. Therefore, the ray scanning apparatus according to the present application can obtain very comprehensive scanning data, thereby ensuring image quality. In this case, although the ray source modules are arranged on merely three sides of the scanning area in the present application, compared to the situation where ray source modules are arranged on four sides of a scanning area, image quality can still be guaranteed and the cost of ray source modules can be saved. Further, no ray source module is arranged on the upper side of the scanning area, which can further facilitate the maintenance of the ray source modules.

Moreover, the control device is connected to the respective scanning beam planes, and controls a beam emitting sequence of the ray source points of the ray source modules of the respective scanning beam planes, particularly so that the ray source modules of the respective scanning beam planes simultaneously emit beams from one ray source point. Consequently, the scanning speed of the ray scanning apparatus can be improved, and the inspection speed can be improved correspondingly, so that the ray scanning apparatus can match the conveying line of the object under inspection (such as the luggage conveying system) which has a relatively high conveying speed and is arranged upstream or downstream of the ray scanning apparatus (for example, the speed of the conveying device is the same as that of the conveying belt of the luggage conveying system).

Moreover, the ray source modules of the respective scanning beam planes may be configured to emit ray beams of different energy, and optionally, the ray source module located on the left or right side of the scanning area emits ray beams having higher energy than that emitted by the ray source module located on the lower side of the scanning area. In this case, when inspecting a luggage with a relatively small thickness and a relatively large width, a penetration rate of the rays in a width direction of the luggage can be ensured, and a quantity of rays that can be detected by the detector assembly can be increased, thereby improving the image quality.

The embodiments of the present application are described in detail below with reference to the accompanying drawings.

Figure 1B:
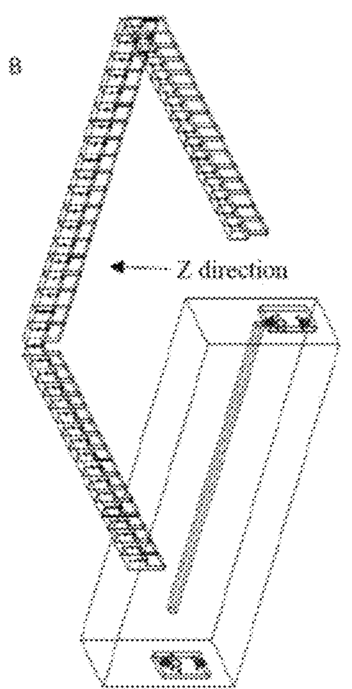
FIGS. 1B and 1C illustrate schematic structural diagrams of ray source modules and detector assemblies of a second scanning beam plane and a third scanning beam plane of the ray scanning apparatus according to an embodiment of the present application.
Figure 1C:
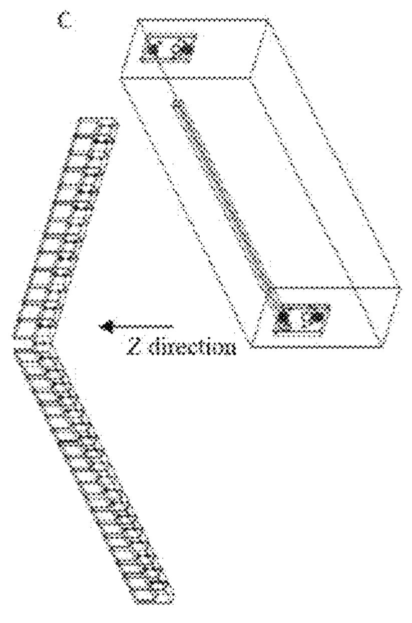

FIGS. 1A-1C schematically illustrate structural diagrams of a ray scanning apparatus according to some embodiments of the present application. FIG. 1A illustrates a schematic diagram of an overall structure of a ray scanning apparatus, and FIG. 1B and FIG. 1C illustrate schematic structural diagrams of a second scanning beam plane and a third scanning beam plane of the ray scanning apparatus in FIG. 1A, respectively. As shown in the figures, the ray scanning apparatus includes a plurality of scanning beam planes (such as a first scanning beam plane A, a second scanning beam plane B, and a third scanning beam plane C), a passage 110, and a conveying device; although the first scanning beam plane A is not shown separately, the first scanning beam plane A is symmetrically arranged with the third scanning beam plane C; the conveying device is not shown in the figures either, but the conveying device is arranged in the passage 110 near a lower surface of the passage 110 and extends through the passage 110. Each scanning beam plane includes a ray source module and a detector assembly. The conveying device conveys an object under inspection to pass through a scanning area of each scanning beam plane to scan the object under inspection. FIG. 1A shows a forward direction Z of the object under inspection, and a conveying direction of the object under inspection (sometimes referred to as a conveying direction or Z direction hereinafter) is defined as a direction parallel to the forward direction of the object under inspection and includes the forward direction and a reverse direction thereof. FIG. 1A further shows an XYZ coordinate system, which can be used as a reference coordinate system to describe the positions of components in the ray scanning apparatus; these position descriptions are intended to clearly describe the principle of the present application and have no limit functions. The forward direction Z of the object under inspection is the same as the Z direction of the XYZ coordinate system.

The ray scanning apparatus shown in FIG. 1A can further include a control device (not shown in the figure), and the control device can control operations of various components of the ray scanning apparatus, such as control emission of rays at each scanning beam plane and data output of the detector assembly. The control device can further include an image processing module, which can perform image reconstruction based on output information from the detector assemblies of the respective scanning beam planes, obtain a scanning image of the object under inspection, and determine internal information of the object under inspection.

According to specific embodiments, the scanning beam planes of the ray scanning apparatus are disposed on a plurality of scanning planes arranging in the conveying direction of the object under inspection. The respective scanning planes are spaced apart from each other at a predetermined distance in the conveying direction of the object under inspection. Here, in a case that optical paths and/or components of the respective scanning beam planes do not interfere with each other, the smaller the distance, the better it is to reduce the length of optical path distribution of the ray scanning apparatus.

Each scanning beam plane includes a ray source module and a detector assembly arranged correspondingly. In each scanning beam plane, the ray source module and the detector assembly can be arranged in the same plane perpendicular to the Z direction, so that a ray outlet of the ray source module is directly opposite detector crystals, so as to avoid the influence of tilt of the rays relative to crystal surfaces on the reconstructed image. Certainly, according to other embodiments, the ray source module and the detector assembly may be arranged in different planes perpendicular to the Z direction, that is, the ray source module and the detector assembly may offset each other by a predetermined distance in the Z direction.

Figure 2:
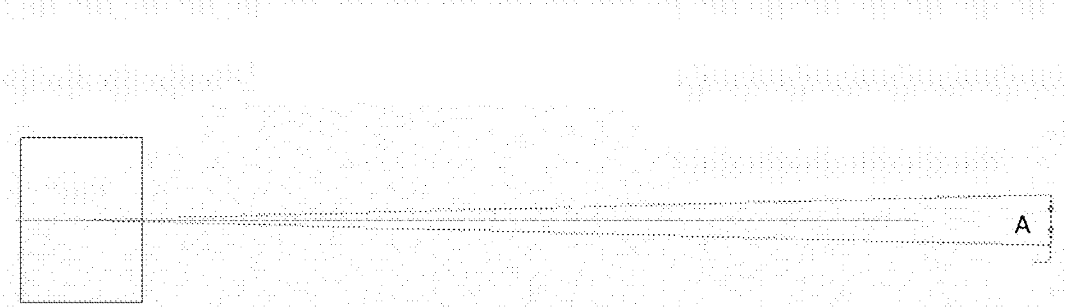
FIG. 2 illustrates a schematic diagram of a shape of a ray beam of a ray source module according to an embodiment of the present application.

The ray source module includes a plurality of ray source points for emitting ray beams. Specifically, the ray source modules may be distributed ray sources, each ray source module has a plurality of target spots, each target spot may generate a ray beam independently, and the plurality of target spots may generate ray beams according to a predetermined time sequence under the control of the control device. The ray beam may be a fan-shaped beam with a flare angle A, as shown in FIG. 2. Certainly, the ray beam is not limited to the fan-shaped beam, but may be in other shapes, for example, may be a conical beam or a parallel beam, which may be set according to specific requirements. Optionally, the ray source modules are straight-line shaped distributed ray sources, that is, the plurality of target spots are arranged in a straight line. According to other embodiments, the ray source modules may alternatively be broken line-shaped or arc-shaped distributed ray sources. Alternatively, each ray source module may be a ray source group including a plurality of single-point sources.

Figure 3A:
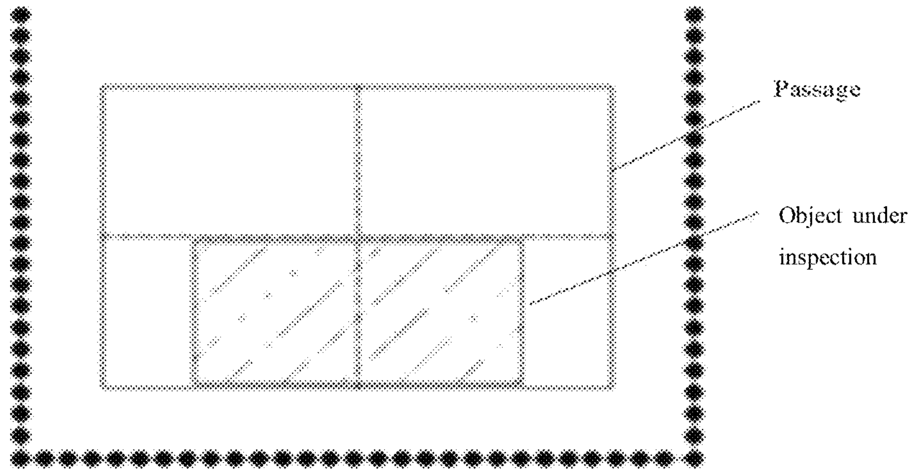
FIGS. 3A and 3B illustrate schematic diagrams of distribution of target spots of a ray source module when observed from a conveying direction of an object under inspection according to an embodiment of the present application.
Figure 3B:
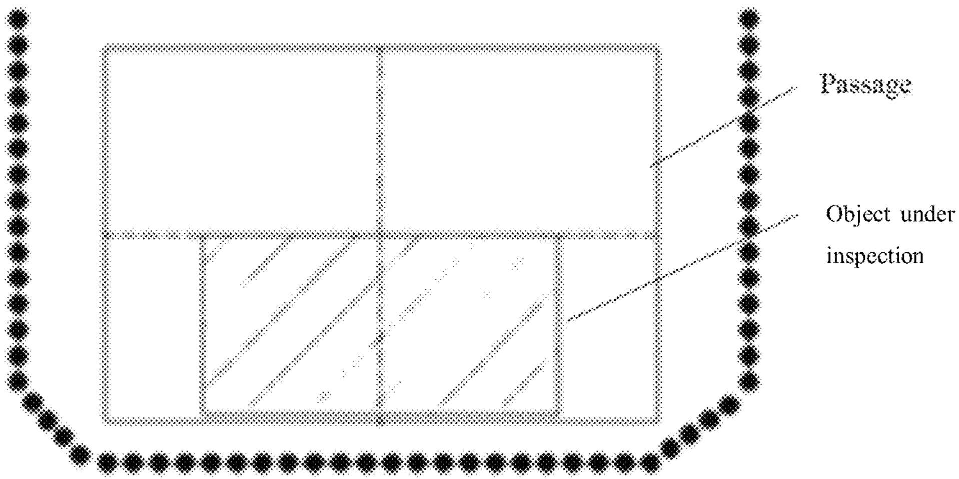

Moreover, in each scanning beam plane, the ray source module is arranged in one direction of the scanning area, and the ray source modules in all the scanning beam planes are arranged in different directions of the scanning area, for example, are arranged on the left side (the first scanning beam plane A), lower side (the second scanning beam plane B), and right side (the third scanning beam plane C) of the scanning area, respectively. Optionally, when observed in the conveying direction of the object under inspection, the ray source modules of these scanning beam planes are arranged as a semi-enclosed structure surrounding the scanning area and opening on the upper side. Depending on the shape of the ray source modules (straight line, broken line, arc-shaped, or the like), the semi-enclosed structure may be a U-shaped structure, a semi-circular structure, a semi-elliptical structure, or the like. For example, as shown in FIG. 3A and FIG. 3B, when the ray source modules are in a straight line or broken line shape, the ray source modules of the plurality of scanning beam planes may be arranged in a U-shaped structure when observed in the conveying direction of the object under inspection. Moreover, optionally, when observed in the conveying direction of the object under inspection, the target spots of the plurality of ray source modules of the plurality of scanning beam planes partially overlap at adjacent ends of the ray source modules. Specifically, taking the arrangement of the ray source modules shown in FIG. 3A as an example, when observed in the conveying direction of the object under inspection, the target spots of the ray source module on the left side of the scanning area and that of the ray source module on the lower side of the scanning area may partially overlap at adjacent ends of the ray source modules (namely, at a lower left corner of the U-shaped structure in the figure), and the target spots of the ray source module on the right side of the scanning area and that of the ray source module on the lower side of the scanning area may partially overlap at adjacent ends of the ray source modules (namely, at a lower right corner of the U-shaped structure in the figure). In this way, it can be further ensured that the object under inspection is fully covered by the rays, missing of projection data at corresponding positions of ends of the ray source modules can be avoided, and image quality can be improved.

Moreover, in each scanning beam plane, the detector assembly is arranged to surround the scanning area in at least two sides. For example, in the first scanning beam plane A, the detector assembly is arranged to surround the scanning area on the upper and right sides, forming an L-shaped structure; in the second scanning beam plane B, the detector assembly is arranged to surround the scanning area on the upper, left, and right sides, forming a U-shaped structure with an opening at the bottom; and in the third scanning beam plane C, the detector assembly is arranged to surround the scanning area on the upper and left sides, forming an L-shaped structure. By arranging the detector assemblies to surround the scanning area in at least two sides, it can be ensured that the detector assemblies can detect almost all the rays penetrating through the object under inspection, thereby obtaining very comprehensive scanning data and ensuring image quality. Moreover, although the detector assemblies in the first scanning beam plane A and the third scanning beam plane C are formed in the L-shaped structures as shown in FIG. 1A, the detector assemblies may alternatively be formed in U-shaped structures opened towards the ray source modules, which can further ensure the comprehensiveness of the scanning data and is more conducive to improving the image quality.

Figure 4:
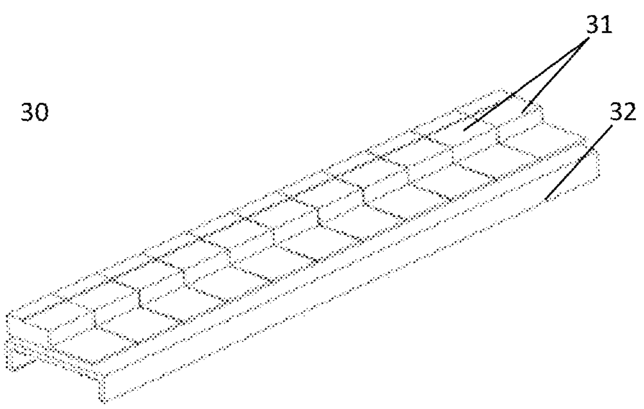
FIG. 4 illustrates a schematic structural diagram of a detector set according to an embodiment of the present application.
Figure 5:
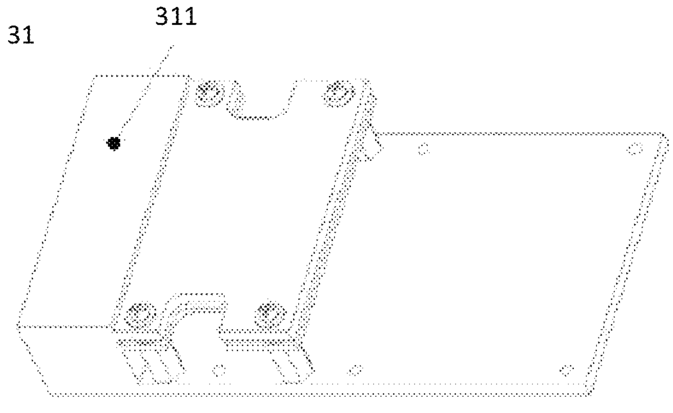
FIG. 5 illustrates a schematic structural diagram of a detector unit according to an embodiment of the present application.

The detector assembly may include a plurality of detector sets, and each detector set is a detector array including a plurality of detector units. The detector array may be a straight line-shaped, arc-shaped, or broken line-shaped detector array. In the embodiments shown in FIGS. 1A-1C, the detector assembly of each scanning beam plane is formed by a plurality of straight-line shaped detector arrays. For example, in each of the first scanning beam plane A and the third scanning beam plane C, the detector assembly includes two detector sets, and each detector set is a straight line-shaped detector array; and in the second scanning beam plane B, the detector assembly includes three detector sets, and each detector set is a straight line-shaped detector array. Here, the detector set in the form of the straight line-shaped detector array may be formed in any suitable structure, and according to some embodiments, its specific structure may be a structure as shown in FIG. 4. As shown in FIG. 4, the detector set 30 includes a plurality of detector units 31 and a detector arm 32, and the plurality of detector units 31 are arranged side by side in a straight line on the detector arm 32. A specific structure of the detector unit 31 may be a structure as shown in FIG. 5, or may be any other suitable structure. As shown in FIG. 5, the detector unit 31 includes a detector crystal 311 for receiving rays. The plurality of detector units 31 are arranged side by side on the detector arm 32, with the detector crystals 311 facing the same direction. The structure of the detector arm 32 is not limited to the embodiment shown in FIG. 5, but may be any other suitable structure (such as structures of detector arms shown in FIGS. 7A-9B). The detector set of the ray scanning apparatus in the present application is not limited to the form of the straight line-shaped detector array, but may be in a form of an arc-shaped detector array. The arc-shaped detector array may include a plurality of arc-shaped detector units and an arc-shaped detector arm, and the plurality of arc-shaped detector units are arranged side by side on the arc-shaped detector arm, where detector crystals of the detector units face the same direction.

In the ray scanning apparatus of the foregoing embodiments, the ray source module of the second scanning beam plane B is arranged on the lower side of the scanning area, so that the height of the conveying device can be increased compared to an apparatus without a ray source module on the lower side of the scanning area. In this case, when the ray scanning apparatus is applied to the luggage conveying system which includes a conveying belt with a relatively high height, a luggage can move between the conveying system and the ray scanning apparatus conveniently. Here, optionally, the conveying device may be configured to have the same height as the conveying belt of the luggage conveying system, so as to further facilitate the movement of the luggage.

In the foregoing embodiments, the ray source modules of the respective scanning beam planes are mounted and detached independently from each other, that is, each ray source module has a separate cavity for accommodating a respective ray generation device. Each ray source module has a separate cavity, which means that the plurality of target spots of each ray source module share a separate vacuum cavity. This has the following advantages: compared to a ray source assembly with an integrated annular cavity (namely, all target spots of the ray source assembly are located in the same annular vacuum cavity), the shell size of one single ray source module and the volume of the internal vacuum cavity can be reduced, so that the volume and weight of one single ray source module are reduced to facilitate mounting and detaching of the ray source assembly; further, each ray source module has a separate vacuum cavity, which can reduce the risk of internal ignition when the ray source module is maintained.

According to some embodiments, the ray source module of each scanning beam plane is provided with a mounting-positioning structure to facilitate mounting and adjustment of the ray source module. By means of the mounting-positioning structure, each ray source module may be mounted and fixed at a predetermined position in the ray scanning apparatus (for example, at a specific position in the ray scanning apparatus based on an XYZ reference coordinate system) to ensure relative positions of the ray source modules and the detector assemblies. Moreover, by means of the mounting-positioning structure, the ray source module may further be rotated to adjust a beam output angle of the ray beam. In this case, when the ray source module and the detector assembly are located in different planes perpendicular to the Z direction, the beam output angle of the ray beam can be adjusted through the mounting-positioning structure, so that the center of the ray beam can illuminate crystal planes.

The ray source modules of the respective scanning beam planes may be mounted in different ways due to their different positions in the ray scanning apparatus, and may have different mounting-positioning structures. For example, the ray source modules on the left and right sides of the scanning area may be mounted by hoisting with a device such as a crane. However, the ray source module on the lower side of the scanning area is not suitable for being mounted by hoisting, but needs to be mounted in other ways. In order to facilitate the mounting of such ray source module, an embodiment of the present application provides a mounting-positioning structure, which can conveniently mount and fix the ray source module that is not suitable for being mounted by hoisting to a predetermined position of the ray scanning apparatus, and can further rotate the ray source module to adjust the beam output angle of the ray beam. According to some embodiments, the mounting-positioning structure includes a main body, and the main body can be fixedly connected to the ray source module and a support frame of the ray scanning apparatus (the support frame refers to a stationary support device of the ray scanning apparatus for mounting and fixing the ray source assembly, detector assembly, and other components), so that the ray source module can be fixedly mounted to the support frame through the main body. The mounting-positioning structure includes a moving device, where the ray source module can be moved to a predetermined mounting position on a first plane (such as an XZ plane in FIG. 1A) through the moving device; a first positioning device for positioning the ray source module on the first plane; a lifting device for adjusting the position of the ray source module in a first direction (such as a Y direction in FIG. 1A, which is perpendicular to the XZ plane), where the first direction is perpendicular to the first plane; and a second positioning device for fixing the position of the ray source module in the first direction.

Figure 6A:
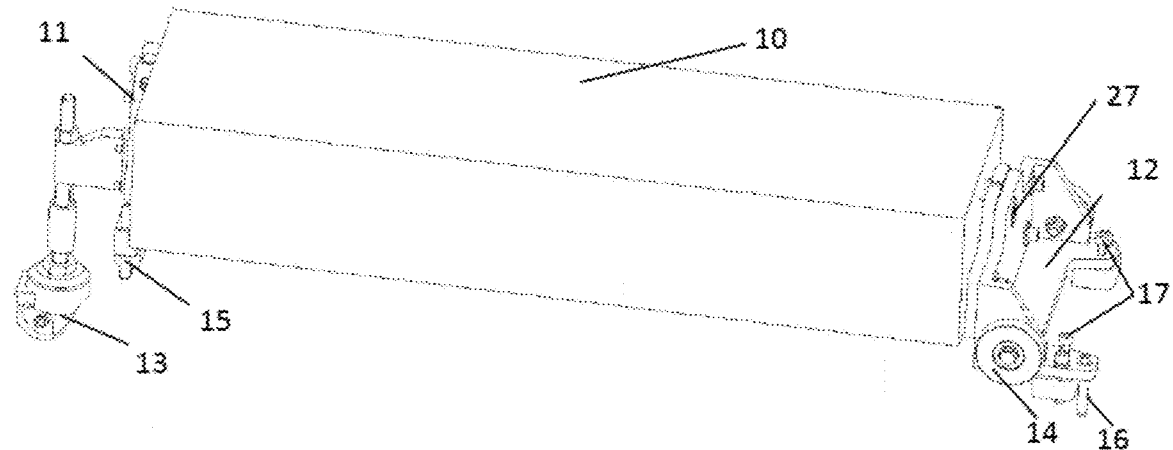
FIGS. 6A-6C illustrate schematic diagrams of a mounting-positioning structure for a ray source module according to an embodiment of the present application.
Figure 6B:
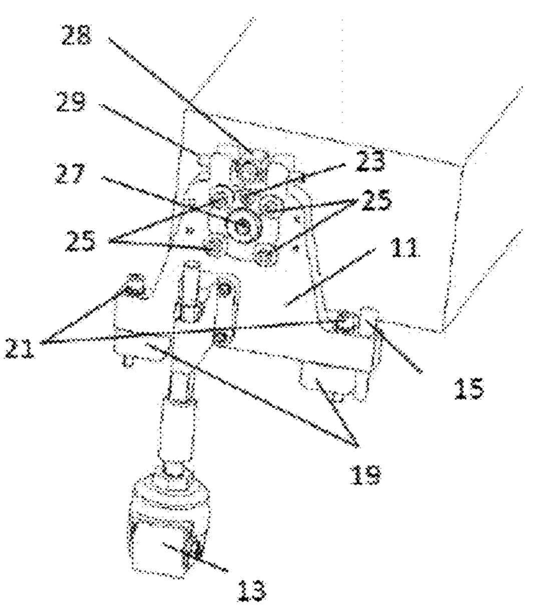
Figure 6C:
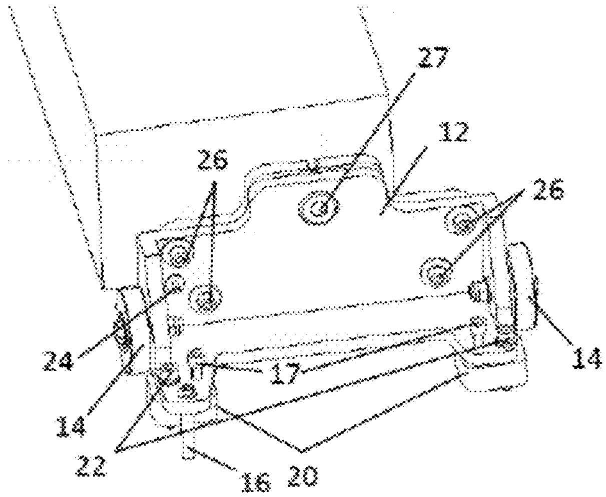

FIGS. 6A-6C show a specific embodiment of the mounting-positioning structure of the ray source module 10. As shown in FIGS. 6A-6C, the mounting-positioning structure includes main bodies 11 and 12, respectively located at two ends of the ray source module 10 in a length direction and fixedly connected to the ray source module 10, and the ray source module 10 is fixedly mounted to the support frame of the ray scanning apparatus through the main bodies 11 and 12. The moving device of the mounting-positioning structure is specifically formed as rollers 13 and 14 arranged on the main bodies 11 and 12 respectively, and the ray source module 10 can be pushed to move to the predetermined mounting position on the XZ plane through the rollers 13 and 14. Certainly, the moving device of the mounting-positioning structure is not limited to rollers; according to other embodiments, the ray source module may be moved by sliding, and for example, a linear sliding fit may be provided between the mounting-positioning structure and the support frame to move the ray source module 10 to the predetermined mounting position.

The first positioning device includes first positioning pins 15 and 16, and corresponding first pin holes (not shown in the figure) disposed on the main bodies 11 and 12 and the support frame of the ray scanning apparatus. After the ray source module 10 is moved to the predetermined mounting position via the rollers 13 and 14, the first positioning pins 15 and 16 are inserted into the corresponding first pin holes to position the ray source module 10 on the XZ plane.

The lifting device includes the roller 13 disposed at the main body 11, where the roller 13 is specifically formed as a lifting roller; and the lifting device further includes a lifting jackscrew 17 disposed on the main body 12, one end of the lifting jackscrew 17 abuts against the support frame, and the main body 12 and the ray source module 10 can be lifted or lowered relative to the support frame by screwing the lifting jackscrew 17. By adjusting the lifting roller 13 and the lifting jackscrew 17, the position of the ray source module 10 relative to the support frame can be adjusted in the Y direction. The second positioning device is formed as positioning blocks 19 and 20. After the ray source module 10 is adjusted to the predetermined position in the Y direction by adjusting the lifting roller 13 and the lifting jackscrew 17, the positioning blocks 19 and 20 are placed below the main body 11 and 12 respectively to fix the height of the ray source module 10 relative to the support frame, thereby positioning the ray source module 10 in the first Y direction. Here, optionally, the positioning block 20 below the main body 12 may be U-shaped, and a lower portion of the lifting jackscrew 17 is located in an opening of the U-shaped positioning block 20 to prevent mutual interference between them. Moreover, the mounting-positioning structure may further include first fixing bolts 21 and 22, and corresponding first threaded holes disposed in the main bodies 11 and 12, the positioning blocks 19 and 20, and the support frame. By inserting the first fixing bolts 21 and 22 respectively into the corresponding first threaded holes and tightening them, the positioning blocks 19 and 20 can be fixed relative to the main bodies 11 and 12 and the support frame, and the ray source module 10 can be fixedly connected to the support frame.

In addition, according to some embodiments, the mounting-positioning structure further includes an adjusting device for rotating the ray source module around a predetermined axis to adjust its beam output angle. According to the specific embodiments of FIGS. 6A-6C, the ray source module 10 is provided with a mounting shaft 27, each of the main bodies 11 and 12 is provided with a shaft hole, and the main bodies 11 and 12 are mounted on the mounting shaft 27 through the shaft holes. Moreover, the mounting-positioning structure further includes second positioning pins 23 and 24, and the main bodies 11 and 12 and the ray source module 10 are provided with second pin holes corresponding to the second positioning pins 23 and 24. By engaging the shaft holes of the main bodies 11 and 12 with the mounting shaft 27, and inserting the second positioning pins 23 and 24 into the corresponding second pin holes, the main bodies 11 and 12 can be positioned relative to the ray source module 10. In addition, the mounting-positioning structure further includes second fixing bolts 25 and 26 for fixedly connecting the main bodies 11 and 12 to the ray source module 10, and corresponding second threaded holes disposed in the main bodies 11 and 12 and the ray source module 10. By screwing the second fixing bolts 25 and 26 into the corresponding second threaded holes, the main bodies 11 and 12 can be fixedly connected to the ray source module 10. By pulling out the second positioning pins 23 and 24 and loosening the second fixing bolts 25 and 26, the main bodies 11 and 12 can be loosened relative to the ray source module 10. In this state, the adjusting device can drive the ray source module 10 to rotate around the mounting shaft 27 relative to the main bodies 11 and 12.

In a specific embodiment, the adjusting device includes a rotation drive mechanism, the rotation drive mechanism includes an adjusting block 28 fixed on the ray source module 10 and a jackscrew 29 disposed on the main body 11 and abutting against the adjusting block 28, and the jackscrew 29 can be screwed to push the adjusting block 28 to move, so as to rotate the ray source module 10. Here, the rotation drive mechanism is disposed on only one main body of the mounting-positioning structure, that is, only at one end of the ray source module 10 in the length direction. Since the ray source module 10 is supported by the mounting shaft 27 at two ends, when the ray source module 10 is pushed to rotate at one end of the ray source module 10, the entire ray source module 10 can rotate accordingly. After the ray source module 10 is rotated by a predetermined angle, the second positioning pins 23 and 24 are inserted into the corresponding second pin holes again, the second fixing bolts 25 and 26 are screwed into the corresponding second threaded holes again, and the main bodies 11 and 12 can be fixedly connected to the ray source module 10.

In the foregoing embodiment, the mounting shaft 27 on the ray source module 10 can coincide with a virtual line which connects the plurality of target spots in the ray source module 10. Therefore, by rotating the ray source module 10 around the mounting shaft 27, the ray source module 10 can rotate around a target spot axis.

In addition, although the mounting-positioning structure according to the foregoing embodiments is described by taking the ray source module 10 as an example, the foregoing mounting-positioning structure is applicable to the mounting, positioning, and adjustment of the ray source assembly of any suitable ray scanning apparatus. Certainly, the mounting, positioning, and adjustment of the ray source module 10 are not limited to using the mounting-positioning structure in the foregoing embodiments, but may be implemented by any other suitable structure. For example, in the embodiment shown in FIGS. 6A-6C, the lifting device is implemented by the lifting roller 13 and the lifting jackscrew 17; however, the lifting device is not limited to the specific structure of the this embodiment, but may be implemented by any other suitable structure, such as lifting and lowering by means of lifting jackscrews on both the main bodies. Similarly, specific implementations of the moving device, the first positioning device, the second positioning device, and the adjusting device are not limited to the specific structures in the foregoing embodiments, and any other suitable structures can be used, as long as their functions can be achieved.

According to some embodiments, the detector sets of the detector assembly of each scanning beam plane can be mounted and detached independently from each other, which can improve the maintainability of the detector assembly. Moreover, the ray scanning apparatus of the present application includes a mounting-fixing structure for a single detector set, and by means of the mounting-fixing structure, the detector set can move relative to its mounting position in the ray scanning apparatus (such as the support frame of the ray scanning apparatus), so as to be mounted to the mounting position or detached from the mounting position.

Hereinafter, the mounting-fixing structure for the detector set according to some embodiments of the present application will be described in detail. The mounting-fixing structure for the detector set according to some embodiments of the present application specifically includes a first mounting portion fixedly disposed on the detector set; a second mounting portion fixedly disposed on the support frame of the ray scanning apparatus and in linear moving fit with the first mounting portion, where the detector set can be moved to a predetermined mounting position along the second mounting portion when the first mounting portion and the second mounting portion engage with each other; and a fixing device disposed on a side of the detector set in a width direction to fix the detector set relative to a mounting reference plane on the support frame. In some specific embodiments, the detector set is mounted and fixed to the support frame of the ray scanning apparatus via the detector arm, where the first mounting portion is fixedly disposed on the detector arm of the detector set, and the fixing device is disposed on a side of the detector arm in the width direction to fix the detector arm to the support frame, so as to fix the detector set.

Figure 7A:
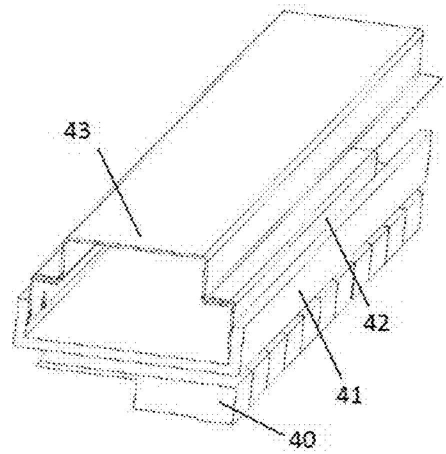
FIGS. 7A-7D illustrate schematic diagrams of a mounting-fixing structure for a detector set according to some embodiments of the present application.
Figure 7B:
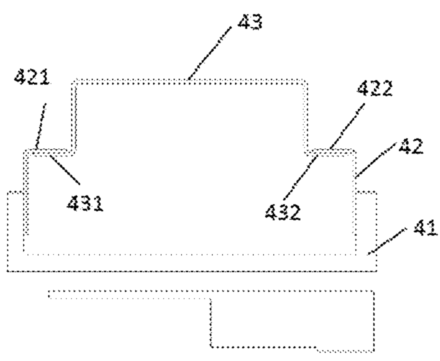
Figure 7C:
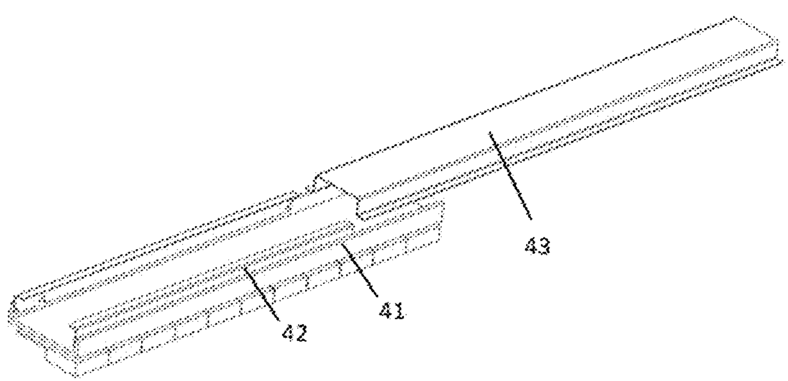
Figure 7D:
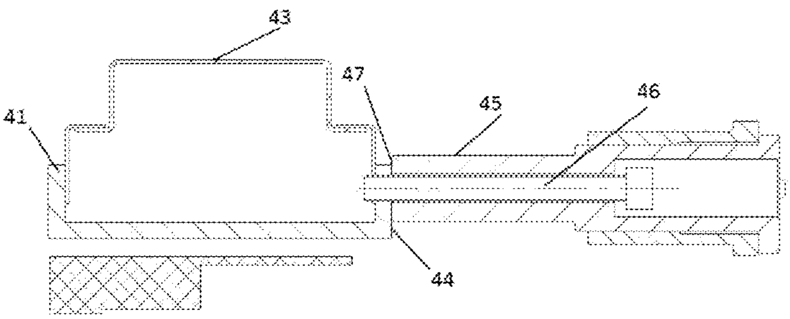

FIGS. 7A-7D show a mounting-fixing structure for a detector set 40 according to some specific embodiments, where FIG. 7A is a three-dimensional diagram of the detector set in a mounting state, FIG. 7B is a side view of the detector set in the mounting state, FIG. 7C is a three-dimensional diagram of the detector set being detached, and FIG. 7D is a cross-sectional view of the detector set with a fixing device in the mounting state. The mounting-fixing structure shown in FIGS. 7A-7D is suitable for, for example, the detector sets on the upper side of the scanning area in the scanning beam planes A, B, and C. With the mounting-fixing structure of this embodiment, the detector set on the upper side of the scanning area can be moved perpendicular to the conveying direction of the object under inspection for being mounted or detached, and can be fixed or adjusted on a side of the detector assembly in the conveying direction of the object under inspection.

As shown in FIG. 7A, the first mounting portion of the mounting-fixing structure for the detector set 40 includes a slider 42 disposed on the detector arm 41, and the slider 42 extends in a length direction of the detector arm 41; in a state that the detector set 40 is mounted in the ray scanning apparatus, the length direction of the detector arm 41 is perpendicular to the conveying direction of the object under inspection, and its width direction is consistent with the conveying direction of the object under inspection. In FIG. 7A, the slider 42 extends over a portion of the length of the detector arm 41. In other embodiments, the slider 42 may alternatively extend over the entire length or other length of the detector arm 41. In addition, the slider 42 may be fixed to the detector arm 41 by bolt connection or the like. According to other embodiments, the slider 42 may alternatively be integrally formed with the detector arm 41.

The second mounting portion is formed as a stationary guide rail 43 matching the slider 42. The stationary guide rail 43 is fixedly connected to the support frame of the ray scanning apparatus (not shown in FIG. 7A), or may be integrally formed with the support frame. A length direction of the stationary guide rail 43 is perpendicular to the conveying direction of the object under inspection on the ray scanning apparatus. A limit portion (not shown in the figure) may be disposed at one end of the stationary guide rail 43 in the length direction; when mounting the detector set 40, the slider 42 is aligned with the stationary guide rail 43, and the detector set 40 is pushed along the stationary guide rail 43 until abutting against the limit portion, so as to be moved to the predetermined mounting position.

The fixing device is disposed on a side of the detector set 40 in the width direction, and abuts against a surface 44 of a side of the detector arm 41 in the width direction. Specifically, the fixing device includes a positioning member 45 and a fastener 46, where the positioning member 45 is fixedly connected to the support frame, its end surface away from the support frame is formed as a mounting reference plane 47, and the mounting reference plane 47 is adapted for abutting against the surface 44 of the side of the detector arm 41 in the width direction. The surface 44 is a mounting surface of the detector arm 41, and both the surface 44 and the mounting reference plane 47 are formed to have good flatness, so that when the mounting surface 44 of the detector arm 41 abuts against the mounting reference plane 47 for fixing, the detector set 40 can be accurately positioned in the width direction, namely, the conveying direction of the object under inspection. The fastener 46 can penetrate through the positioning member 45 and fasten the detector set 40 relative to the end surface of the positioning member 45 (namely, the mounting reference plane 47). Specifically, the fastener 46 may be, for example, a fastening bolt, and corresponding threaded holes are disposed on the positioning member 45 and a side surface, opposite to the positioning member 45, of the detector arm 41. By inserting the fastening bolt 46 into the corresponding threaded holes and tightening the same, the detector set 40 can be fastened relative to the end surface of the positioning member 45 (namely, the mounting reference plane 47). A plurality of, such as at least two, fixing devices may be disposed in the length direction of the detector set 40 to firmly fix the detector set 40 to the support frame.

Through the above mounting-fixing structure, when mounting the detector set 40, in a state that the detector units of the detector set 40 face downwards, the slider 42 on the detector set 40 is first aligned with the stationary guide rail 43, so as to move the detector set 40 along the stationary guide rail 43 until the detector set 40 abuts against the limit portion on the stationary guide rail 43; and then the fastening bolt 46 is inserted into the corresponding threaded holes on the positioning member 45 and the detector arm 41 and is tightened, so as to position the detector set 40 relative to the end surface of the positioning member 45, namely, the mounting reference plane 47. When detaching the detector set 40, reverse operations can be performed.

Because the length direction of the stationary guide rail is perpendicular to the conveying direction of the object under inspection on the ray scanning apparatus and a side of the detector set 40 in the X direction is not obstructed by a ray source module, the detector set 40 can be mounted to or detached from the support frame in a direction perpendicular to the conveying direction of the object under inspection on the ray scanning apparatus by means of the above mounting-fixing structure. Moreover, the fixing device is disposed on a side of the detector set in the width direction, namely, a side of the detector assembly in the Z direction, which facilitates fixing or adjustment of the detector set. Therefore, the detector set can be easily mounted, detached and maintained by means of the mounting-fixing structure according to the foregoing embodiment.

In addition, optionally, in the above mounting-fixing structure, the second mounting portion is configured to support the detector set 40 at the predetermined mounting position in a state of engaging with the first mounting portion. Specifically, the slider 42 is disposed on two opposite sides of the detector arm 41 in the width direction, and includes internal extension portions 421 and 422 extending inwards from edges of the two opposite sides of the detector arm 41 in the width direction (see FIG. 7B); the stationary guide rail 43 includes external extension portions 431 and 432 extending outwards on two opposite sides in the width direction (see FIG. 7B); and in the state of engagement of the slider 42 and the stationary guide rail 43, the internal extension portions 421 and 422 of the slider 42 are located above the external extension portions 431 and 432 of the stationary guide rail 43, and are in contact and overlapped with the external extension portions 431 and 432. In this case, after the detector set 40 moves along the stationary guide rail 43 to the predetermined mounting position, the detector set 40 can be suspended by the external extension portions 431 and 432 of the stationary guide rail 43 through the internal extension portions 421 and 422 of the slider 42. In this way, the stationary guide rail 43 can support the detector set 40 at the predetermined mounting position without other auxiliary structures or tools, and when fastening the detector set 40, an operator can operate without supporting the detector set 40, so the convenience of operation is improved.

Moreover, in the above mounting-fixing structure, the linear moving fit between the first mounting portion and the second mounting portion is a slider-guide rail fit, or may be other linear moving fit according to other embodiments, for example, linear sliding or linear rolling fit, such as linear ball bearing and cylindrical shaft fit.

Figure 8A:
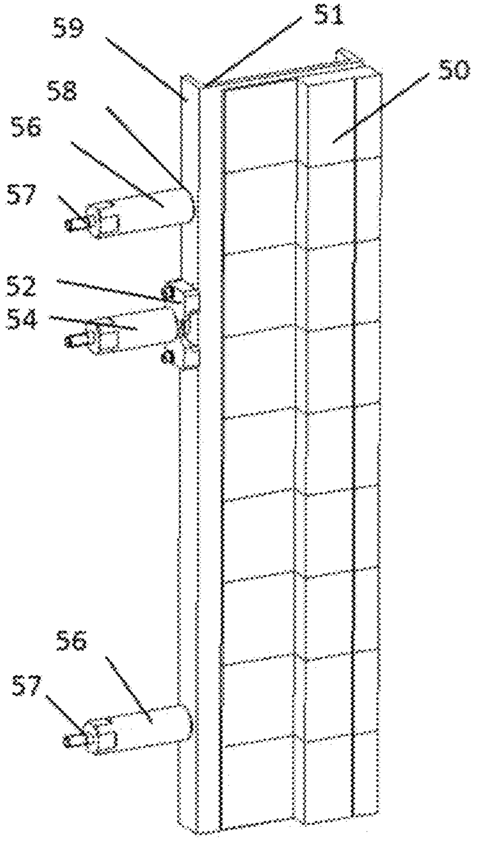
FIGS. 8A-8D illustrate schematic diagrams of a mounting-fixing structure for a detector set according to some further embodiments of the present application.
Figure 8B:
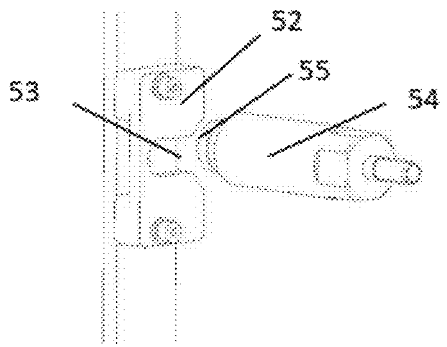
Figure 8C:
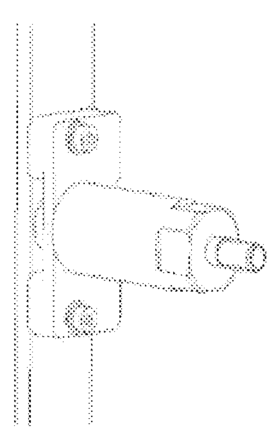
Figure 8D:
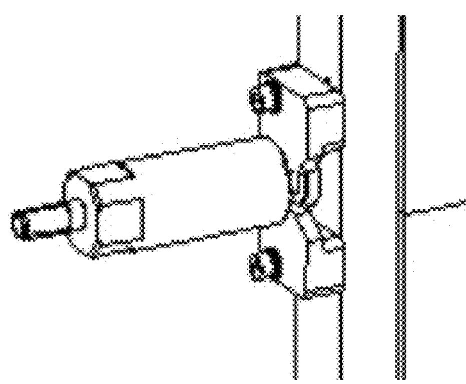

The mounting-fixing structure in the foregoing embodiments is applicable to the detector set on the upper side of the scanning area. FIGS. 8A-8D show a mounting-fixing structure for a detector set according to other embodiments, where FIG. 8A is a three-dimensional diagram of the detector set in a mounting state, FIG. 8B is a schematic diagram of a first mounting portion and a second mounting portion of the mounting-fixing structure in a separate state, and FIG. 8C and FIG. 8D are three-dimensional diagrams of the first mounting portion and the second mounting portion of the mounting-fixing structure in an engaging state from different perspectives.

The mounting-fixing structure shown in FIGS. 8A-8D is suitable for, for example, the detector sets on the left or right side of the scanning area in the scanning beam planes A, B, and C. With the mounting-fixing structure of the present embodiment, the detector set on the left or right side of the scanning area can be moved perpendicular to the conveying direction of the object under inspection for being mounted or detached, and can be fixed or adjusted on a side of the detector assembly in the Z direction.

The first mounting portion of the mounting-fixing structure for the detector set 50 is specifically formed as a fixing block 52 disposed on a side of the detector arm 51 in a width direction, and the fixing block 52 has an opening 53 facing a side of the detector arm 51 in a thickness direction. In the mounting state of the detector set 50, the width direction of the detector arm 51 is consistent with the conveying direction of the object under inspection on the ray scanning apparatus, and its length and thickness directions are perpendicular to the conveying direction of the object under inspection. The opening 53 of the fixing block 52 may be U-shaped or in other suitable shapes. The fixing block 52 may be fixedly connected to the detector arm 51 by a bolt or the like, or may be integrally formed with the detector arm 51.

The second mounting portion is formed as a cantilever portion 54 fixed on the support frame of the ray scanning apparatus, the cantilever portion 54 is provided with an extension portion 55 at an end away from the support frame, and the extension portion 55 is in linear moving fit with the opening 53 on the fixing block 52, that is, the extension portion 55 can move linearly from an edge of the opening 53 to the inside of the opening 53. The length direction of the cantilever portion 54 is consistent with the conveying direction of the object under inspection on the ray scanning apparatus. The bottom of the opening 53 may be used as a limit portion. When mounting the detector set 50, the opening 53 of the fixing block 52 on the detector arm 51 is aligned with the extension portion 55, and the detector arm 51 is moved linearly relative to the extension portion 55 until the bottom of the opening 53 abuts against the extension portion 55, so as to limit the detector set 50 at a predetermined mounting position.

The fixing device is disposed on a side of the detector arm 51 in the width direction (on the same side as the fixing block 52), an end surface of the fixing device is formed as a mounting reference plane, and the fixing device fastens the detector arm 51 relative to the mounting reference plane. Specifically, the fixing device may include a fixing member 56 and a fastener 57, and an end surface, away from the support frame, of the fixing member 56 is formed as a mounting reference plane 58, which is used for abutting against a surface 59 of a side of the detector arm 51 in the width direction. The surface 59 is a mounting surface of the detector arm 51, both the surface 59 and the mounting reference plane 58 are machined to have good flatness. When the mounting surface 59 of the detector arm 51 abuts against the mounting reference plane 58 for fixing, the detector set 50 can be accurately positioned in the conveying direction of the object under inspection. The fastener 57 is used for fastening the detector arm 51 relative to the end surface 58 of the fixing member 56. The fastener 57 may be a fixing bolt, corresponding threaded holes are formed on the side, opposite to the fixing member 56, of the detector arm 51 in the width direction and the fixing member 56, and the fixing bolt can penetrate through the corresponding threaded holes on the fixing member 56 and the detector arm 51 and be tightened to fasten the detector set 50 relative to the mounting reference plane 58. In addition, a plurality of, such as at least two, fixing devices may be provided, and the plurality of fixing devices may be spaced apart from each other in the length direction of the detector set 50 to firmly fix and position the detector set 50.

Through the above mounting-fixing structure, when mounting the detector set 50, in a state that the detector units face the scanning area and the width direction of the detector set 50 is consistent with the conveying direction of the object under inspection, the opening 53 of the fixing block 52 on the detector set 50 is first aligned with the extension portion 55 of the cantilever portion 54, and the detector set 50 is moved along the extension portion 55 until the bottom of the opening 53 abuts against the extension portion 55; then, the fastener 57 is inserted into the corresponding threaded holes on the fastener 56 and the detector arm 51 and is tightened, thereby positioning the detector set 50 relative to the mounting reference plane 58 of the fastener 56. When detaching the detector set 50, reverse operations can be performed.

According to the above mounting-fixing structure, the cantilever portion 54 extends in the conveying direction of the object under inspection in the ray scanning apparatus, the width direction of the detector set 50 is parallel to the conveying direction of the object under inspection, and the opening 53 of the fixing block 52 faces a side of the detector set 50 in the thickness direction, by ensuring that the detector crystals face the scanning area and the length direction of the detector arm is in the Y direction, the detector set 50 can be mounted or detached along a direction perpendicular to the conveying direction of the object under inspection. Moreover, the fixing device is disposed on a side of the detector set 50 in the width direction, namely, a side of the detector assembly in the Z direction, which facilitates to fix or adjust the detector set. Therefore, the detector set can be easily mounted, detached and maintained by means of the mounting-fixing structure according to the foregoing embodiment.

In addition, optionally, in the above mounting-fixing structure, the second mounting portion is configured to support the detector set 50 at the predetermined mounting position in a state of engaging with the first mounting portion. That is, after the detector set 50 is moved to the predetermined mounting position relative to the extension portion 55 of the cantilever portion 54, the cantilever portion 54 can support the entire detector set 50 through the fixing block 52 without other auxiliary structures or tools. In this way, when fastening the detector set 50, neither an additional tool nor an operator is required to support the detector set 50 for operation, thereby improving the convenience of operation.

Therefore, with the above mounting-fixing structure of various embodiments described above, the detector set in the ray scanning apparatus of the present application can be mounted to or detached from the support frame along a direction perpendicular to the conveying direction of the object under inspection, can be fixed or adjusted on a side in the conveying direction of the object under inspection, and thus can be mounted, detached and maintained conveniently.

As mentioned above, with the mounting-fixing structure of the foregoing embodiments, the detector set is mounted or detached in the direction perpendicular to the conveying direction of the object under inspection. However, in some cases, such operation is not convenient. As mentioned earlier, it is desirable to set the distance between the scanning beam planes as short as possible without interference between optical paths and/or components, so as to reduce the length of optical path distribution of the ray scanning apparatus. On this premise, because the ray source module is larger than the detector assembly (especially in the Z direction) in dimension, and the ray source module is located on an outer side in a direction perpendicular to the conveying direction of the object under inspection relative to the detector set of other scanning beam planes on the same side as the ray source module, the mounting or detaching of the detector set in the direction perpendicular to the conveying direction of the object under inspection may be hindered by the ray source module of adjacent scanning beam plane (as shown in FIG. 1A, the ray source module of the first scanning beam plane A may hinder the mounting and detaching of the detector set of the second scanning beam plane B). In this case, the detector set of the second scanning beam plane B, such as the detector set near the ray source module of the first scanning beam plane A and located on the left side of the scanning area, may be mounted or detached along the conveying direction of the object under inspection relative to a mounting position, for example, the support frame, and thus the detector set can be mounted, detached, fixed, or adjusted without detaching the ray source module, thereby improving operation convenience. Correspondingly, a different mounting-fixing structure is required for such mounting and detaching manner. A specific embodiment of such mounting-fixing structure is described in detail below.

Similar to the mounting-fixing structure in the foregoing embodiments, the mounting-fixing structure suitable for mounting and detaching the detector set along the conveying direction of the object under inspection also specifically includes a first mounting portion fixedly disposed on the detector set; a second mounting portion fixedly disposed on the support frame of the ray scanning apparatus and in linear moving fit with the first mounting portion, where the detector set can move along the second mounting portion to the predetermined mounting position when the first mounting portion and the second mounting portion engage with each other; and a fixing device disposed on a side of the detector set in a width direction to fix the detector set relative to a mounting reference plane on the support frame. In some specific embodiments, the detector set is mounted and fixed to the support frame of the ray scanning apparatus via the detector arm, where the first mounting portion is fixedly disposed on the detector arm, and the fixing device is disposed on a side of the detector arm in the width direction to fix the detector arm to the support frame, so as to fix the detector set.

Figure 9A:
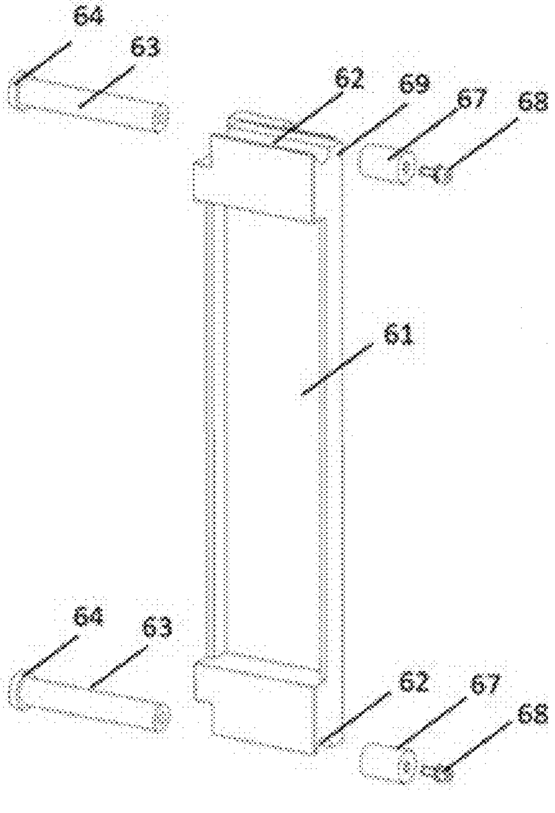
FIGS. 9A-9B illustrate schematic diagrams of a mounting-fixing structure for a detector set according to some other embodiments of the present application.
Figure 9B:
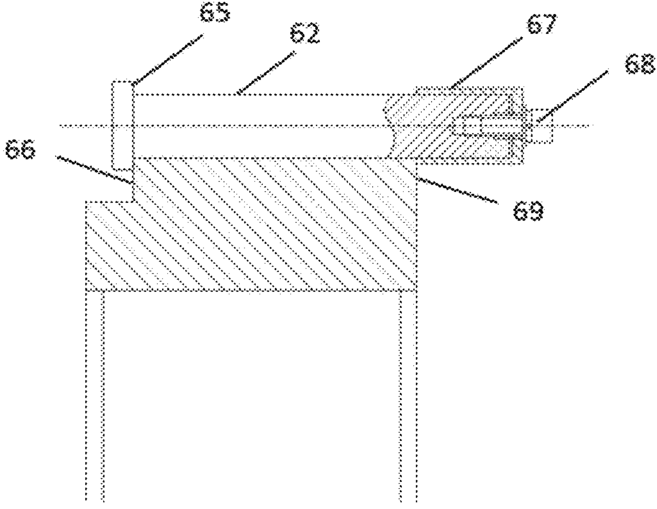

FIGS. 9A-9B show a mounting-fixing structure for a detector set according to some specific embodiments, where FIG. 9A is an exploded three-dimensional diagram of a detector arm and the mounting-fixing structure, and FIG. 9B is a partial cross-sectional view of the detector arm in a mounting and fixing state of the detector set. FIGS. 9A and 9B do not show a complete detector set, but show only a detector arm, where a plurality of detector units can be arranged side by side in a length direction on the shown detector arm to form a complete detector set.

As shown in FIGS. 9A and 9B, the first mounting portion of the mounting-fixing structure for the detector set 60 is specifically formed as a sliding groove 62 extending in the width direction of the detector arm 61. In a state of being mounted to the support frame of the ray scanning apparatus, the width direction of the detector arm 61 is consistent with the conveying direction of the object under inspection, and its length direction is perpendicular to the conveying direction of the object under inspection. The second mounting portion is formed as a sliding rod 63 matching the sliding groove 62. The sliding groove 62 is formed as a semi-circular, open sliding groove, and the sliding rod 63 is correspondingly formed as a cylindrical sliding rod. The sliding rod 63 is fixedly disposed on the support frame or integrally formed with the support frame, and its length direction is consistent with the conveying direction of the object under inspection. An end, near the support frame, of the sliding rod 63 is configured to increase in size relative to the remaining portion of the sliding rod 63 to form a protruding portion 64. An end surface, facing the detector arm 61, of the protruding portion 64 is formed as a mounting reference plane 65 for abutting against a surface 66 of a side of the detector arm 61 in the width direction. The surface 66 is a mounting surface of the detector arm 61, and both the surface 66 and the mounting reference plane 65 are machined to have good flatness. When the mounting surface 66 of the detector set abuts against the mounting reference plane 65 for positioning, the detector set 60 can be accurately positioned in the width direction, namely, the conveying direction of the object under inspection. The protruding portion 64 may further be used as a limit portion. When mounting the detector set 60, the sliding groove 62 is aligned with the sliding rod 63, and the detector arm 61 is pushed towards the support frame along the sliding rod 63 until abutting against the protruding portion 64, so as to be moved to the predetermined mounting position.

The fixing device is disposed at the other end, opposite to the protruding portion 64, of the sliding rod 63 and arranged to abut against, together with the protruding portion 64, two sides of the detector arm 61 in the width direction, so as to limit the position of the detector arm 61 in the width direction. Specifically, the fixing device includes a positioning sleeve 67 and a fastener 68, the positioning sleeve 67 is sleeved on the other end, opposite to the protruding portion 64, of the sliding rod 63 and abuts against a surface 69 of the other side of the detector arm 61 in the width direction, and the fastener 68 fixes the positioning sleeve 67 to the other end, opposite to the protruding portion 64, of the sliding rod 63. Specifically, the fastener 68 may be a fastening screw, and threaded holes are disposed on the positioning sleeve 67 and the other end of the sliding rod 63. By screwing the fastening screw into the threaded holes, the positioning sleeve 67 can be fastened relative to the sliding rod 63, thereby fixing the detector arm 61 in the width direction relative to the sliding rod 63 (namely, the support frame). Meanwhile, because the shape matching of the sliding rod 63 and the sliding groove 62 limits degree of freedom of the detector arm 61, the detector arm 61 can be fully positioned and fixed.

Through the above mounting-fixing structure, when mounting the detector set 60, in a state that the detector units face the scanning area and the width direction of the detector set 60 is consistent with the conveying direction of the object under inspection, the sliding groove 62 of the detector arm 61 is first aligned with the sliding rod 63, and the detector arm 61 is moved along the sliding rod 63 until abutting against the protruding portion 64; then, the positioning sleeve 67 is sleeved on the end, opposite to the protruding portion 64, of the sliding rod 63 and fixed with screws relative to the sliding rod 63, thereby fixing the detector arm 61. When detaching the detector set 60, reverse operations can be performed.

Through the above mounting-fixing structure, the sliding rod 63 extends in the conveying direction of the object under inspection, that is, the linear moving fit between the detector set and the support frame is in the conveying direction of the object under inspection, the fixing device is disposed on one side of the detector set in the width direction, and the width direction of the detector set is consistent with the conveying direction of the object under inspection. Therefore, by means of the above mounting-fixing structure, the detector set can be moved in the conveying direction of the object under inspection for being mounted or detached, and can be fixed or adjusted on one side in the conveying direction of the object under inspection. Therefore, the detector set can be mounted, detached or maintained from a side surface in the conveying direction of the object under inspection. Even if the detector set is obstructed by the ray source module of other scanning beam planes on the outer side in the direction perpendicular to the conveying direction, the mounting, detaching or maintenance of the detector set can avoid the obstruction of the ray source module, and can be performed without detaching the ray source module, thereby improving the convenience of mounting, detaching and maintenance of the detector assembly.

In addition, optionally, the second mounting portion of the above mounting-fixing structure is configured to support the detector set 60 at the predetermined mounting position in a state of engaging with the first mounting portion. Specifically, the second mounting portion includes two sliding rods 63, and two sliding grooves 62 are correspondingly formed on the detector arm 61 at two ends of the detector arm 61 in the length direction, so that after the detector arm 61 moves to the predetermined mounting position on the two sliding rods 63, the two sliding rods 63 can support the detector set at the predetermined mounting position without other auxiliary structures and/or tools. In this way, when fastening the detector set, neither an additional tool nor an operator is required to support the detector set for operation, thereby improving the convenience of operation.

Although the detector arm is shown in the vertical direction in FIGS. 9A and 9B, the above mounting-fixing structure is not limited to be merely used for mounting and detaching the detector set arranged vertically in the ray scanning apparatus, but can also be used for detector sets arranged in other directions.

The mounting-fixing structure between the detector set 60 and the support frame is not limited to the embodiments shown in FIGS. 9A-9B, and other suitable mounting-fixing structures may also be used. For example, according to some embodiments, the linear moving fit of the mounting-fixing structure may be replaced by other suitable fits, such as linear rolling fit between a linear ball bearing and a cylindrical shaft. According to some other embodiments, the cross-section of the sliding groove 62 is not limited to be semi-circular, but may be semi-rectangular or the like, and correspondingly, the sliding rod 63 is not limited to be cylindrical, but may be prism-shaped or the like to match the sliding groove 62.

Therefore, the detector set of the ray scanning apparatus according to the present application may be configured to be mounted, detached or maintained along the conveying direction of the object under inspection, thereby facilitating mounting, detaching and maintenance thereof.

However, the embodiments of the present application are not limited to mounting or detaching all the detector sets only along the conveying direction of the object under inspection or along the direction perpendicular to the conveying direction of the object under inspection, it is also available that some of the detector sets may be mounted or detached along the conveying direction of the object under inspection, and the other detector sets may be mounted or detached along the direction perpendicular to the conveying direction of the object under inspection, and which method is used can be determined based on the specific layout of the ray scanning apparatus, as long as the detector sets can be easily mounted, detached and maintained.

Moreover, the detector sets of each scanning beam plane in different directions relative to the scanning area may be mounted to or detached from the support frame by using different mounting-fixing structures, but by means of mounting reference planes for different detector sets, the detector sets of the same scanning beam plane can be located at a predetermined position in the conveying direction of the object under inspection after being mounted, to ensure that the detector sets are located in the same plane perpendicular to the Z direction or located in different planes offset by a predetermined distance and perpendicular to the Z direction, as long as the mounting reference planes for the detector sets of the same scanning beam plane are correspondingly disposed in the same plane perpendicular to the Z direction or in different planes offset by the predetermined distance and perpendicular to the Z direction.

In addition, the mounting-fixing structures in the foregoing embodiments are not limited to be used for the detector sets of the ray scanning apparatus of the present application, but may also be used for detector sets of other suitable ray scanning apparatuses.

As mentioned earlier, the ray scanning apparatus according to the embodiments of the present application further include a control device, and the control device is configured to control a beam emitting sequence of the ray source modules in the respective scanning beam planes. Optionally, the control device may be configured so that the ray source modules of the respective scanning beam planes emit beams from one ray source point simultaneously. For example, the ray source module of the first scanning beam plane A includes target spots A1, A2, A3, . . . . An; the ray source module of the second scanning beam plane B includes target spots B1, B2, B3, . . . . Bn; and the ray source module of the third scanning beam plane C includes target spots C1, C2, C3, . . . . Cn. The control device may control the target spots of the ray source modules of the scanning beam planes A, B, and C to simultaneously emit beams in the following sequence: A1B1C1→A2B2C2→A3B3C3→ . . . AnBnCn. The control device is not limited to controlling the target spots of the plurality of ray source modules to simultaneously emit beams in the above sequence, that is, the sequence of the target spots emitting rays in each ray source module is not limited to the sequence from target spot 1 to target spot n, but may be interval, reverse, or random, as long as all the target spots in the ray source module can be traversed.

According to the foregoing embodiments, the ray source modules in the respective scanning beam planes simultaneously emit beams, thereby improving the scanning speed of the ray scanning apparatus. Therefore, when the ray scanning apparatus is applied to the luggage conveying system or the like, the scanning speed can be matched with the high-speed luggage conveying speed of the luggage conveying system, thereby avoiding accumulation of luggage caused by security inspection and improving the luggage conveying speed. Optionally, the conveying device of the ray scanning apparatus may be configured to have the same speed as the conveying belt of the luggage conveying system.

Moreover, compared to the situation where the ray source modules in the scanning beam planes alternately emit beams, the simultaneous emission of beams by the ray source modules in the respective scanning beam planes can not only improve the scanning speed, but also reduce a radiation dose (for example, current may be one-third of the current for the alternate emission of beams in a case of constant voltage), so as to reduce requirements on the ray scanning apparatus for shielding radiation and thus reduce device costs.

According to some embodiments, the ray beams of the ray source modules of the respective scanning beam planes have different energy. The ray source modules may be optionally configured to emit ray beams with different energy for different sizes of the object under inspection in various directions. For example, in a case that the object under inspection is an airport luggage, the size is usually small in a thickness direction (namely, the up-down direction of the ray scanning apparatus, the Y direction in FIG. 1A) and large in a width direction (namely, the left-right direction of the ray scanning apparatus, the X direction in FIG. 1A); therefore, in order to obtain a high penetration rate in the width direction, the ray source module arranged on the left or right side of the scanning area (such as the ray source module of the first scanning beam plane A and the ray source module of the third scanning beam plane C) may emit ray beams with high energy to ensure the ray penetration rate in the width direction and increase valid data detected by the detector assembly, thereby improving image quality. Correspondingly, the ray source module arranged on the lower side of the scanning area (such as the ray source module of the second scanning beam plane B) may emit ray beams with lower energy than the ray source module on the left or right side of the scanning area, thereby reducing the radiation dose while ensuring the ray penetration rate.

The various specific embodiments of the ray scanning apparatus according to the present application are described above.

An embodiment of the present application further provides a ray scanning system for luggage inspection, which includes the ray scanning apparatus described in any of the foregoing embodiments and a luggage conveying system. The luggage conveying system is used for conveying a plurality of pieces of luggage at airports and other places, and includes a conveying belt for bearing luggage movement. The ray scanning apparatus is used for scanning the plurality of pieces of luggage in the luggage conveying system to inspect prohibited items and the like in the luggage. The ray scanning apparatus may be arranged at the beginning, middle part, or end of the luggage conveying system, and the conveying device of the ray scanning apparatus is arranged adjacent to the conveying belt of the luggage conveying system, so that the luggage can move between them. The ray scanning apparatus includes a ray source module arranged below the conveying device, so that the conveying device has a relatively high height from the ground to match the height of the conveying belt of the luggage conveying system, or alternatively has the same height as the conveying belt of the luggage conveying system. Moreover, the ray scanning apparatus includes a control device, and the control device is configured so that the ray source modules of the respective scanning beam planes simultaneously emit beams from one target spot to scan luggage, so that the ray scanning apparatus can inspect the object under inspection, such as luggage, at a speed matching the conveying speed of the luggage conveying system, and optionally, the speed of the conveying device of the ray scanning apparatus is the same as that of the conveying belt of the luggage conveying system. Therefore, the ray scanning system according to the present application can conveniently convey luggage between the luggage conveying system and the ray scanning apparatus, and can perform security inspection on the luggage with a relatively high speed.

The embodiments of the present application further provide a mounting-positioning structure for a ray source module and a ray scanning apparatus as defined by the following items.

1. A mounting-positioning structure for a ray source module of a ray scanning apparatus, the ray scanning apparatus includes the ray source module and a stationary support frame, the mounting-positioning structure includes a main body, and the main body can be fixedly connected to the ray source module and the support frame, so that the ray source module can be fixedly mounted to the support frame through the main body, the mounting-positioning structure further includes:

a moving device, where the ray source module can be moved to a predetermined mounting position on a first plane through the moving device;

a first positioning device for positioning the ray source module on the first plane;

a lifting device for adjusting a position of the ray source module in a first direction, where the first direction is perpendicular to the first plane; and a second positioning device for fixing the position of the ray source module in the first direction.

2. The mounting-positioning structure according to item 1, where the moving device includes rollers disposed at two ends of the ray source module in a length direction.

3. The mounting-positioning structure according to item 1, where the first positioning device includes a first positioning pin and first pin holes disposed on the main body and the support frame and corresponding to the first positioning pin.

4. The mounting-positioning structure according to item 1, where the lifting device is disposed at two ends of the ray source module in the length direction, the lifting device is formed as a lifting roller at one end, and the lifting device is formed as a lifting jackscrew at the other end.

5. The mounting-positioning structure according to item 4, where the second positioning device is formed as a positioning block, which is placed below the main body after the ray source module is adjusted by the lifting device to a predetermined position in the first direction.

6. The mounting-positioning structure according to any of items 1-5, further including:

an adjusting device for rotating the ray source module around a predetermined axis to adjust a beam output angle of the ray source module.

7. The mounting-positioning structure according to item 6, where the ray source module is provided with a mounting shaft, the main body is provided with a corresponding shaft hole, and the main body is mounted on the mounting shaft of the ray source module through the shaft hole;

the mounting-positioning structure further includes a positioning member and a fastener, and the main body is positioned relative to the ray source module through the positioning member and engagement of the shaft hole with the mounting shaft, and is fixedly connected to the ray source module through the fastener; and the adjusting device includes a rotation drive mechanism, which can drive the ray source module to rotate around the mounting shaft when the positioning member and the fastener are loosened.

8. The mounting-positioning structure according to item 7, where the rotation drive mechanism includes an adjusting block fixed on the ray source module and a jackcrew disposed on the main body and abutting against the adjusting block, and the jackscrew can be rotated to push the adjusting block to move, so as to rotate the ray source module.

9. The mounting-positioning structure according to item 7, where the positioning member includes a second positioning pin and corresponding second pin holes formed on the main body and the ray source module, and the fastener includes a fixing bolt and corresponding threaded holes formed on the main body and the ray source module.

10. A ray scanning apparatus, including a ray source module and a stationary support frame, where the ray source module is fixedly mounted to the support frame via the mounting-positioning structure according to any of items 1-9.

11. The ray scanning apparatus according to item 10, where the ray scanning apparatus enables the ray source module to rotate through the mounting-positioning structure to adjust a beam output angle of the ray source module.

The embodiments of the present application further provide a mounting-fixing structure for a detector assembly and a ray scanning apparatus as defined by the following items.

1. A mounting-fixing structure for a detector assembly of a ray scanning apparatus, the ray scanning apparatus includes the detector assembly and a stationary support frame, the detector assembly include at least two detector sets, each detector set is fixedly mounted to the support frame or detached from the support frame via the mounting-fixing structure, and the mounting-fixing structure includes:

a first mounting portion fixedly disposed on the detector set;

a second mounting portion fixedly disposed on the support frame and capable of being in linear moving fit with the first mounting portion, where the detector set can be moved along the second mounting portion to a predetermined mounting position when the first mounting portion and the second mounting portion engage with each other; and a fixing device disposed on a side of the detector set in a width direction to fix the detector set relative to a mounting reference plane on the support frame.

2. The mounting-fixing structure according to item 1, where the second mounting portion is further configured to support the detector set at the predetermined mounting position in a state of engaging with the first mounting portion.

3. The mounting-fixing structure according to item 1 or 2, where the first mounting portion includes a slider, the slider extends in a length direction of the detector set, and the second mounting portion includes a stationary guide rail matching the slider.

4. The mounting-fixing structure according to item 3, where the fixing device includes a fastener and a positioning member disposed on the support frame, an end surface, away from the support frame, of the positioning member is formed as the mounting reference plane for abutting against a surface of the side of the detector set in the width direction, and the fastener penetrates through the positioning member and fastens the detector set relative to the end surface of the positioning member.

5. The mounting-fixing structure according to item 3, where the slider is disposed on two opposite sides of the detector set in the width direction, and includes internal extension portions extending inwards from edges of the two opposite sides of the detector set in the width direction;

the stationary guide rail includes external extension portions extending outwards from two opposite sides in the width direction; and in an engaging state of the first mounting portion and the second mounting portion, the internal extension portions of the slider are located above the external extension portions of the stationary guide rail, and are in contact and overlapped with the external extension portions, so as to suspend the detector set on the stationary guide rail.

6. The mounting-fixing structure according to item 1 or 2, where the first mounting portion is formed as a sliding groove extending in the width direction of the detector set, and the second mounting portion is formed as a sliding rod matching the sliding groove.

7. The mounting-fixing structure according to item 6, where an end, near the support frame, of the sliding rod is formed with a protruding portion, and a surface, facing the detector set, of the protruding portion is formed as the mounting reference plane for abutting against a surface of the other side of the detector set in the width direction.

8. The mounting-fixing structure according to item 7, where the fixing device is disposed at the other end, opposite to the protruding portion, of the sliding rod, and the fixing device and the protruding portion are arranged to abut against two sides of the detector set in the width direction respectively.

9. The mounting-fixing structure according to item 8, where the fixing device includes a positioning sleeve and a fastener, the positioning sleeve is sleeved on the other end of the sliding rod and abuts against the side of the detector set in the width direction, and the fastener is used for fixing the positioning sleeve to the other end of the sliding rod.

10. The mounting-fixing structure according to item 6, where the second mounting portion includes two sliding rods, the first mounting portion includes two sliding grooves formed at two ends of the detector set in the length direction, and the two sliding rods engage with the two sliding grooves respectively to support the detector set at the predetermined mounting position.

11. The mounting-fixing structure according to item 1 or 2, where the first mounting portion is formed as a fixing block fixed on the side of the detector set in the width direction, and the fixing block has an opening facing a side of the detector set in a thickness direction; and the second mounting portion is formed as a cantilever portion fixed on the support frame, an extension portion is disposed at an end, away from the support frame, of the cantilever portion, and the extension portion can be in linear moving fit with the opening of the fixing block.

12. The mounting-fixing structure according to item 11, where the fixing device includes a fixing member and a fastener disposed on the support frame, an end surface, away from the support frame, of the fixing member is formed as the mounting reference plane for abutting against the surface of the side of the detector set in the width direction, and the fastener is used for fastening the detector set to the end surface of the fixing member.

13. The mounting-fixing structure according to item 11, where in an engaging state of the first mounting portion and the second mounting portion, the cantilever portion supports the detector set at the predetermined mounting position through the fixing block.

14. A ray scanning apparatus, including a detector assembly and a stationary support frame, where the detector assembly includes at least two detector sets, and each detector set is mounted to the support frame or detached from the support frame through the mounting-fixing structure according to any of items 1-13.

15. The ray scanning apparatus according to item 14, where a width direction of the detector set is parallel to a conveying direction of an object under inspection, a length direction and a thickness direction of the detector set are perpendicular to the conveying direction of the object under inspection, and the conveying direction of the object under inspection is a direction in which the object under inspection is conveyed to pass through a scanning area of the ray scanning apparatus.

16. The ray scanning apparatus according to item 15, where a mounting reference plane for each detector set is located in a plane perpendicular to the conveying direction of the object under inspection.

17. The ray scanning apparatus according to item 14 or 15, where the first mounting portion moves linearly relative to the second mounting portion in a direction parallel to or perpendicular to the conveying direction of the object under inspection.

The above descriptions of the present application are for the purpose of illustration and explanation, but not for exhausting the exact implementations of the present application or limiting the present application to the described exact implementations. Many modifications or changes may be made within the scope of the inventive principles of the present application. The described embodiments are intended to best explain the principles and practical applications of the present application. The above descriptions enable other technical personnel in the art to better utilize and practice various embodiments and modifications of the present application. The scope of the present application is defined by the appended claims.

What is claimed is:

1. A ray scanning apparatus for a luggage conveying system, comprising:

a conveying device for conveying an object under inspection to pass through a scanning area of the ray scanning apparatus; and a plurality of scanning beam planes, respectively disposed on a plurality of scanning planes arranging in a conveying direction of the object under inspection, each scanning beam plane comprising a ray source module and a detector assembly which are arranged opposite each other, and the ray source module of each scanning beam plane is a distributed ray source which comprises a plurality of target spots for emitting ray beams, and a separate vacuum cavity for accommodating the plurality of target spots, wherein the ray source modules of the plurality of scanning beam planes are arranged on a lower side, a left side, and a right side of the scanning area respectively, and are mounted or detached independently from each other, and wherein when observed in the conveying direction of the object under inspection, the ray source modules of the plurality of scanning beam planes are arranged around the scanning area from three sides in a U-shape with an opening toward an upper side of the scanning area.

2. The ray scanning apparatus according to claim 1, wherein the ray source modules are formed in a straight line, broken line, or arc shape.

3. The ray scanning apparatus according to claim 1, wherein in each scanning beam plane, the detector assembly is arranged to surround the scanning area in at least two sides.

4. The ray scanning apparatus according to claim 3, wherein in the scanning beam plane where the ray source module is arranged on the lower side of the scanning area, the detector assembly is formed in a U-shaped structure surrounding the scanning area and opening on a lower side.

5. The ray scanning apparatus according to claim 3, wherein in the scanning beam plane where the ray source module is arranged on the left or right side of the scanning area, the detector assembly is formed in an L-shaped or U-shaped structure surrounding the scanning area.

6. The ray scanning apparatus according to claim 1, wherein the luggage conveying system comprises a conveying belt, and a speed and height of the conveying device match those of the conveying belt of the luggage conveying system.

7. The ray scanning apparatus according to claim 6, wherein the speed and height of the conveying device are the same as those of the conveying belt of the luggage conveying system.

8. The ray scanning apparatus according to claim 1, further comprising a control device, wherein the control device is configured to control a beam emitting sequence of the ray source modules in respective scanning beam planes, so that the ray source modules in the respective scanning beam planes simultaneously emit ray beams from one ray source point.

9. The ray scanning apparatus according to claim 8, wherein the ray beams of the ray source modules of the respective scanning beam planes have the same energy.

10. The ray scanning apparatus according to claim 8, wherein the ray beams of the ray source module arranged on the left or right side of the scanning area have energy higher than that of the ray beams of the ray source module arranged on the lower side of the scanning area.

11. A ray scanning system for luggage inspection, comprising the ray scanning apparatus according to claim 1 and a luggage conveying system, the luggage conveying system comprises a conveying belt for conveying luggage, wherein the conveying device of the ray scanning apparatus matches the conveying belt in height and speed.

12. The ray scanning system according to claim 11, wherein the conveying device of the ray scanning apparatus has the same height and speed as the conveying belt of the luggage conveying system.

13. A mounting-positioning structure for a ray source module of the ray scanning apparatus according to claim 1, wherein the ray scanning apparatus comprises the ray source module and a stationary support frame, the mounting-positioning structure comprises a main body, and the main body is fixedly connected to the ray source module and the support frame, so that the ray source module is fixedly mounted to the support frame through the main body, the mounting-positioning structure further comprises:

a moving device, wherein the ray source module is moved to a predetermined mounting position on a first plane through the moving device;

a first positioning device for positioning the ray source module on the first plane;

a lifting device for adjusting a position of the ray source module in a first direction, wherein the first direction is perpendicular to the first plane; and a second positioning device for fixing the position of the ray source module in the first direction.

14. A mounting-fixing structure for a detector assembly of the ray scanning apparatus according to claim 1, wherein the ray scanning apparatus comprises the detector assembly and a stationary support frame, the detector assembly comprises at least two detector sets, each detector set is fixedly mounted to the support frame or detached from the support frame via the mounting-fixing structure, and the mounting-fixing structure comprises:

a first mounting portion fixedly disposed on the detector set;

a second mounting portion fixedly disposed on the support frame and capable of being in linear moving fit with the first mounting portion, wherein the detector set is moved along the second mounting portion to a predetermined mounting position when the first mounting portion and the second mounting portion engage with each other; and a fixing device disposed on a side of the detector set in a width direction to fix the detector set relative to a mounting reference plane on the support frame.

15. The ray scanning system according to claim 1, wherein when observed in the conveying direction of the object under inspection, the target spots of the ray source modules of the plurality of scanning beam planes are arranged around the scanning area from three sides in a U-shape with an opening toward the upper side of the scanning area.

16. The ray scanning system according to claim 1, wherein at least one of the ray source modules is provided with a mounting-positioning structure, which is adapted for mounting and positioning the ray source module and rotating the ray source module to adjust an output angle of the ray beams.

* * * * *